United States Patent [19]
Martin et al.

[11] Patent Number: 5,150,425
[45] Date of Patent: Sep. 22, 1992

[54] CHARACTER RECOGNITION METHOD USING CORRELATION SEARCH

[75] Inventors: Gregory J. Martin, Canandaigua, N.Y.; Robert Y. Chen, Seattle, Wash.; John F. Cook; James A. Mason, both of Rochester, N.Y.

[73] Assignee: Eastman Kodak Company, Rochester, N.Y.

[21] Appl. No.: 752,801

[22] Filed: Aug. 30, 1991

[51] Int. Cl.$^5$ .............................................. G06K 9/62
[52] U.S. Cl. ...................................... 382/14; 382/15; 395/21; 395/23
[58] Field of Search ................. 382/14, 15, 42, 30, 382/34; 395/21, 20, 23, 77

[56] References Cited

U.S. PATENT DOCUMENTS

| | | | |
|---|---|---|---|
| 3,873,972 | 3/1975 | Levine | 382/14 |
| 4,177,448 | 12/1979 | Brayton | 382/14 |
| 4,764,973 | 8/1988 | O'Hair | 382/15 |
| 4,805,225 | 2/1989 | Clark | 382/15 |
| 4,932,065 | 6/1990 | Feldgajer | 382/15 |

Primary Examiner—Joseph Mancuso
Attorney, Agent, or Firm—Raymond L. Owens

[57] ABSTRACT

A character recognition method comprising the following steps: (1) acquiring a two dimensional array of pixels, (2) locating an unknown character in the two dimensional array, (3) computing correlation coefficients between an unknown character and a trained set of characters (i.e., a font), (4) recognizing the unknown character as the trained character with the highest correlation coefficient above a threshold. The manner in which trained characters are chosen is described herein as a correlation search. Correlation search results in a fast means of correctly classifying an unknown character from a large training set, often on the second or third try, depending on the inner-correlations of the trained characters.

5 Claims, 10 Drawing Sheets

FIG. 3D

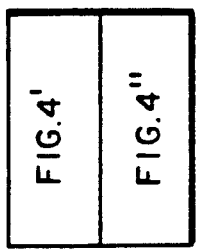

| 255 | 255 | 255 | 255 | 0 | 0 | 0 |
|---|---|---|---|---|---|---|
| 255 | 0 | 0 | 0 | 0 | 0 | 0 |
| 255 | 0 | 0 | 0 | 0 | 0 | 0 |
| 255 | 255 | 255 | 255 | 0 | 0 | 0 |
| 255 | 0 | 0 | 0 | 0 | 0 | 0 |
| 255 | 0 | 0 | 0 | 0 | 0 | 0 |
| 255 | 0 | 0 | 0 | 0 | 0 | 0 |

769 — 'G'

| 0 | 255 | 255 | 255 | 0 | 0 | 0 |
|---|---|---|---|---|---|---|
| 255 | 0 | 0 | 0 | 0 | 0 | 255 |
| 255 | 0 | 0 | 0 | 0 | 0 | 0 |
| 255 | 0 | 0 | 255 | 255 | 255 | 255 |
| 255 | 0 | 0 | 0 | 0 | 0 | 255 |
| 255 | 0 | 0 | 0 | 0 | 0 | 255 |
| 0 | 255 | 255 | 255 | 0 | 255 | 0 |

770 — 'I'

| 255 | 255 | 255 | 255 | 255 | 0 | 0 |
|---|---|---|---|---|---|---|
| 0 | 0 | 255 | 0 | 0 | 0 | 0 |
| 0 | 0 | 255 | 0 | 0 | 0 | 0 |
| 0 | 0 | 255 | 0 | 0 | 0 | 0 |
| 0 | 0 | 255 | 0 | 0 | 0 | 0 |
| 0 | 0 | 255 | 0 | 0 | 0 | 0 |
| 255 | 255 | 255 | 255 | 255 | 0 | 0 |

771 — 'O'

| 0 | 128 | 128 | 128 | 0 | 0 | 128 |
|---|---|---|---|---|---|---|
| 128 | 0 | 0 | 0 | 0 | 0 | 128 |
| 128 | 0 | 0 | 0 | 0 | 0 | 128 |
| 128 | 0 | 0 | 0 | 0 | 0 | 128 |
| 128 | 0 | 0 | 0 | 0 | 0 | 128 |
| 128 | 0 | 0 | 0 | 0 | 0 | 128 |
| 0 | 128 | 128 | 128 | 0 | 0 | 0 |

772 — 'P'

| 255 | 255 | 255 | 255 | 0 | 0 | 0 |
|---|---|---|---|---|---|---|
| 255 | 0 | 0 | 0 | 255 | 0 | 0 |
| 255 | 0 | 0 | 0 | 0 | 255 | 0 |
| 255 | 255 | 255 | 255 | 0 | 0 | 0 |
| 255 | 0 | 0 | 0 | 0 | 0 | 0 |
| 255 | 0 | 0 | 0 | 0 | 0 | 0 |
| 255 | 0 | 0 | 0 | 0 | 0 | 0 |

773 — 'Q'

| 0 | 64 | 64 | 64 | 0 | 0 | 0 |
|---|---|---|---|---|---|---|
| 64 | 0 | 0 | 0 | 0 | 0 | 64 |
| 64 | 0 | 0 | 0 | 0 | 0 | 64 |
| 64 | 0 | 0 | 0 | 0 | 0 | 64 |
| 64 | 0 | 0 | 0 | 64 | 0 | 64 |
| 64 | 0 | 0 | 0 | 0 | 64 | 64 |
| 0 | 64 | 64 | 64 | 0 | 64 | 64 |

774 — 'R'

| 255 | 255 | 255 | 255 | 0 | 0 | 0 |
|---|---|---|---|---|---|---|
| 255 | 0 | 0 | 0 | 0 | 0 | 255 |
| 255 | 0 | 0 | 0 | 0 | 0 | 255 |
| 255 | 255 | 255 | 255 | 0 | 0 | 0 |
| 255 | 0 | 255 | 0 | 0 | 0 | 0 |
| 255 | 0 | 0 | 255 | 0 | 0 | 0 |
| 255 | 0 | 0 | 0 | 255 | 0 | 0 |

775 — 'T'

| 255 | 255 | 255 | 255 | 255 | 0 | 0 |
|---|---|---|---|---|---|---|
| 0 | 0 | 255 | 0 | 0 | 0 | 0 |
| 0 | 0 | 255 | 0 | 0 | 0 | 0 |
| 0 | 0 | 255 | 0 | 0 | 0 | 0 |
| 0 | 0 | 255 | 0 | 0 | 0 | 0 |
| 0 | 0 | 255 | 0 | 0 | 0 | 0 |
| 0 | 0 | 255 | 0 | 0 | 0 | 0 |

FIG. 4B

| | 'ZERO' | 'ONE' | '8' | '9' | 'B' | 'C' | 'D' | 'E' | 'F' | 'G' | 'I' | 'O' | 'P' | 'Q' | 'R' | 'T' |
|---|---|---|---|---|---|---|---|---|---|---|---|---|---|---|---|---|
| 'ZERO' | 100 | 1 | 43 | 31 | 35 | 49 | 51 | 6 | 2 | 37 | 1 | 70 | 10 | 51 | 1 | 1 |
| 'ONE' | 1 | 100 | 0 | 0 | 0 | 0 | 0 | 2 | 2 | 0 | 42 | 1 | 3 | 0 | 0 | 13 |
| '8' | 43 | 0 | 100 | 79 | 70 | 45 | 36 | 23 | 13 | 36 | 0 | 51 | 29 | 36 | 13 | 0 |
| '9' | 31 | 0 | 79 | 100 | 56 | 28 | 24 | 14 | 5 | 23 | 0 | 35 | 17 | 24 | 6 | 0 |
| 'B' | 35 | 0 | 70 | 56 | 100 | 44 | 60 | 43 | 34 | 31 | 0 | 46 | 56 | 29 | 29 | 0 |
| 'C' | 49 | 0 | 45 | 28 | 44 | 100 | 55 | 26 | 11 | 70 | 0 | 70 | 16 | 55 | 7 | 0 |
| 'D' | 51 | 0 | 36 | 24 | 60 | 55 | 100 | 18 | 10 | 43 | 0 | 79 | 24 | 59 | 9 | 0 |
| 'E' | 6 | 2 | 23 | 14 | 43 | 26 | 18 | 100 | 62 | 10 | 14 | 10 | 37 | 9 | 29 | 2 |
| 'F' | 2 | 2 | 13 | 5 | 34 | 11 | 10 | 62 | 100 | 3 | 1 | 3 | 68 | 0 | 45 | 4 |
| 'G' | 37 | 0 | 36 | 23 | 31 | 70 | 43 | 10 | 3 | 100 | 0 | 59 | 6 | 43 | 4 | 0 |
| 'I' | 1 | 42 | 0 | 0 | 0 | 0 | 0 | 14 | 1 | 0 | 100 | 0 | 0 | 0 | 0 | 61 |
| 'O' | 70 | 1 | 51 | 35 | 46 | 70 | 79 | 10 | 3 | 59 | 0 | 100 | 13 | 79 | 4 | 1 |
| 'P' | 10 | 3 | 29 | 17 | 56 | 16 | 24 | 37 | 68 | 6 | 0 | 13 | 100 | 6 | 70 | 0 |
| 'Q' | 51 | 0 | 36 | 24 | 29 | 55 | 59 | 9 | 0 | 43 | 0 | 79 | 6 | 100 | 9 | 4 |
| 'R' | 1 | 0 | 13 | 6 | 29 | 7 | 9 | 29 | 45 | 4 | 0 | 4 | 70 | 9 | 100 | 0 |
| 'T' | 1 | 13 | 0 | 0 | 0 | 0 | 0 | 2 | 4 | 0 | 61 | 1 | 0 | 4 | 0 | 100 |

CHARACTER RECOGNITION METHOD USING CORRELATION SEARCH

FIELD OF THE INVENTION

This invention relates to correlation methods for performing character recognition whereby the "best match" (i.e., the trained character resulting in the highest correlation with the unknown character) is used to select and classify a character as a member of a trained set of characters (i.e., a font). In this specification, the term font training denotes the process of creating and storing all of the trained characters in a font. The term inspect denotes the process of recognizing each unknown character as one of the trained characters of a font. The correlations are computed from the two dimensional array of pixels for the unknown character and for the training set of characters. In this invention, the "best match" character is found by searching thru a correlation matrix. Herein after these correlation methods will be referred to as a correlation search. The elements of the pre-computed correlation matrix are the expected correlation scores of every trained character in the font with every other trained character in the font. An apparatus for implementing character recognition using correlation search is described herein.

BACKGROUND OF THE INVENTION

Correlation is a technique well known to those skilled in the art of developing character recognition methods. The process of recognizing an unknown character using correlation is comprised of the following steps: (1) acquiring a two dimensional array of pixels, (2) locating an unknown character in the two dimensional array, (3) computing the correlations between the unknown character and every member of a trained set of characters (otherwise known as a font), (4) recognizing the unknown character as the trained character with the highest associated correlation coefficient above a threshold.

The correlation between an unknown character and a trained character can be conveniently described using vector notation. That is, let the vector y denote the light values (relative scene reflectance, intensity, etc.) of the pixels of the unknown i character to be recognized. That is, let $$y = [y_1, y_2, \ldots, y_N]^T \quad (1)$$

where $y_i$ denotes the light value of the i-th pixel of the unknown character and $()^T$ denotes the transpose operator. In this representation there are N pixels in the unknown character y. That is, the two dimensional array of pixels for the unknown character is represented as a one dimensional array by concatenating rows (or columns) into a single vector.

In a similar manner, let x denote the vector of light values of a trained character from a font, i.e., $$x = [x_1, x_2, \ldots, x_N]^T \quad (2)$$

where $x_i$ denotes the light value of the i-th pixel of the trained character x. For simplicity, it is assumed that both the unknown character and the trained characters have the same number of pixels, N. If this were not true, the two vectors can be made the same size by appropriately increasing/decreasing the size of the unknown character y to that of the trained character x by utilizing the surrounding pixels in the image.

With these definitions, a normalized mean-corrected correlation (squared) $R^2_{xy}$ between the unknown character y and the trained character x can be written as $$R^2_{xy} = \frac{[x_c^T y_c]^2}{[x_c^T x_c][y_c^T y_c]} \quad (3)$$

where $$x_c = x - \mu_x \quad (3a)$$

$$y_c = y - \mu_y \quad (3b)$$

are the mean-corrected character vectors and $$x_c^T = [x_{c,1}\, x_{c,2} \ldots x_{c,N}]^T \quad (3c)$$

$$y_c^T = [y_{c,1}\, y_{c,2} \ldots y_{c,N}]^T \quad (3d)$$

and the i-th components of the mean vectors are given by $$(\mu_x)_i = \Sigma x_i / N, \; i = 1, 2, \ldots, N \quad (3e)$$

$$(\mu_y)_i = \Sigma y_i / N, \; i = 1, 2, \ldots, N \quad (6b\; 3f)$$

According to the above description, $R^2_{xy}$ is computed for all M trained characters of the font $\{x_1, x_2, \ldots, x_M\}$ and the unknown character y is identified as that trained character $x_j$ that results in the highest correlation score among all the scores calculated.

An additional condition for a match is that the highest correlation score $(R^2_{xy})_{max}$ exceed some predetermined threshold $(R^2_{xy})_{thresh}$. Otherwise, the unknown character does not match any of the trained characters.

The correlation (squared) as defined in equation (3) has several desirable properties. Namely, the correlation $R^2_{xy}$ in equation (3) is insensitive to variations in illumination level and character contrast. That is, doubling the intensity or contrast of unknown character y does not affect the correlation score. This is a direct result of the normalization and mean-correction steps of equation (b 3) and can be easily proved (by those skilled in the art).

Equation (3) shows that the correlation squared $R^2_{xy}$ is computed rather than the correlation $R_{xy}$. This is done as a mathematical convenience to avoid having to compute the square root. Note that $R^2_{xy}$ as given by equation (3) is bounded in the range of 0.00 to 1.00. In practice, the correlation (squared) is usually multiplied by 100 to provide a more convenient 0 to 100 scale.

By substituting equations (3a) thru (3f) into equation (3), $R^2_{xy}$ can be written in a computationally efficient form as $$R^2_{xy} = \frac{\left[N \sum_{i=1}^{N} x_i y_i - \left(\sum_{i=1}^{N} x_i\right)\left(\sum_{i=1}^{N} y_i\right)\right]^2}{\left[N \sum_{i=1}^{N} x_i^2 - \left(\sum_{i=1}^{N} x_i\right)^2\right]\left[N \sum_{i=1}^{N} y_i^2 - \left(\sum_{i=1}^{N} y_i\right)^2\right]} \quad (4)$$

In this expression, the summations involving only $x_i$ can be computed prior to inspection. Thus, there are only three summations that need to be computed during an inspection: the cross-product term and the sum and sum-squared of $y_i$. This results in a computationally fast algorithm.

The above describes the state of the art in performing character recognition using correlation of the light value of pixels of an unknown character with the various members of a font. However, there is a deficiency associated with the above method. That is, the above method requires the computation of the correlation (squared) $R^2_{xy}$ for every trained character in the font $\{x_1, x_2, \ldots, x_M\}$ before y can be classified. For a large font, the time required to compute all of the correlations may be prohibitive.

Thus, a character recognition method is desired that overcomes this deficiency associated with the state of the art correlation method. That is, a character recognition method using correlation search is desired. Correlation search provides a means of classifying an unknown character y without having to compute the correlation of y with every trained character in the font $\{x_1, x_2, \ldots, x_M\}$. For a large font, the time savings can be significant. Correlation search is described in this invention.

DETAILED DESCRIPTION

This invention describes a character recognition method based on correlation search. Correlation search provides a means of classifying an unknown character y without having to compute the correlation of y with every trained character in the font $\{x_1, x_2, \ldots, x_M\}$. Correlation search relies on pre-computing the inner correlations of every trained character $x_j$ with every other trained character $x_k$ during font training prior to runtime. The inner-correlations $R^2_{x_j x_k}$ are conveniently grouped into a font correlation (squared) matrix $R_{MxM}$. The correlation matrix $R_{MxM}$ provides a means for quickly searching through the font until a trained character $(x_j)_{max}$ is found that has a correlation (squared) $R^2_{x_j y}$ with the unknown character y that exceeds a threshold $(R^2_{xy})$thresh.

Correlation search is accomplished by initially choosing a trained character $x_j$ based on a priori knowledge about the list of possibilities (i.e., constraints) for unknown character y. This prior knowledge is input to the character recognition apparatus by the user prior to inspection (during training). If there is no prior information, then a trained character $x_j$ is chosen at random. In any case, the correlation $R^2_{x_j y}$ is computed and compared to the threshold $(R^2_{xj})_{thresh}$. If $R^2_{x_j y}$ is greater than $(R^2_{xy})$thresh, then the correlation search is completed. If $R^2_{x_j y}$ is less than $(R^2_{xy})_{thresh}$, then the row of $R_{MxM}$ corresponding to trained character $x_j$ is searched for an entry that most closely matches the value $R^2_{x_j y}$. The trained character $x_k$ corresponding to this column of $R_{MxM}$ becomes the next trained character to try if it is also contained in the allowed list of possibilities (constraints field) defined by the user during training. The correlation $R^2_{x_k y}$ is computed and compared to $(R^2_{xy})$thresh and the above process is repeated until a trained character $(x_j)_{max}$ is found such that $R^2_{(xj)max\,y}$ exceeds $(R^2_{xy})_{thresh}$. Correlation search quite often takes only several iterations, but depends on the inner correlations of $R_{MxM}$ and the size M of the font.

It might happen that the unknown character y is not highly correlated with any of the trained characters in the font $\{x_1, x_2, \ldots, x_M\}$. In this case, if allowed, correlation search will test all of the trained characters in the font. The computation time for this case may be prohibitive. To prevent this, a maximum limit, $N_{triesmax}$, can be defined on the number of tries that correlation search will perform. Usually $N_{triesmax}$ is set to less than the size of the font but greater than three. Since correlation search usually correctly classifies an unknown character that truly is a trained character in several tries, properly limiting the number of tries usually does not result in failure to correctly classify an unknown character that really is a member of the training set.

Having successfully completed the correlation search, the trained character $(x_j)_{max}$ is a candidate for correctly classifying the unknown character y. However, it is possible that character y is more highly correlated with some other trained character $x_k$. However, this can only occur if $R^2_{x_j x_k}$ also exceeds a threshold $(R^2_{xy})_{thresh2}$. Ideally, this second threshold should be set equal to the first threshold. However, in practice the second threshold is set lower than the first to take into account noise in the observation vector y as compared to the vectors obtained during training. This can be verified considering correlation in terms of a multidimensional vector space and realizing than the correlation coefficient is the cosine of the angle between any two vectors in this space.

Thus, trained characters $(x_j)_{max}$ and $x_k$ must be highly correlated to at least the value of $(R^2_{xy})_{thresh2}$ for $x_k$ to be considered a candidate for classifying the unknown character y. This is easily tested by searching along the row of $R_{MxM}$ corresponding to the trained character $(x_j)_{max}$ for any entries that are greater than $(R^2_{xy})_{thresh}$. The trained characters $x_k$ corresponding to these entries, if any, are first verified that they satisfy the list of possibilities (constraints) for the unknown character y. If they do not satisfy the list of possibilities for unknown character y, then $x_k$ is skipped and the next entry is checked. If true, then $x_k$ is correlated with the unknown character y resulting in a score $R^2_{x_k y}$. If $R^2_{x_k y}$ is greater than $R^2_{x_j y}$ then $x_k$ replaces $(x_j)_{max}$ as the candidate for correctly classifying the unknown character y. This process is repeated until every candidate $x_k$ is tested. Once the process is complete, the unknown character y is classified as the trained character $(x_j)_{max}$.

The object of this invention is to provide a character recognition method that precludes having to test every member of a font before an unknown character can be classified. More particularly, in accordance with this invention, a method of character recognition, comprises the steps of:

1) font training or creating a font of trained characters by:
   (a) acquiring an image composed of a two dimensional array of pixels;
   (b) locating all of the characters in the image by selectively scanning columns or rows of a predetermined area of the image and comparing each pixels intensity with a reference level to determine the first pixel of each character and recording the location (column and row coordinates) of such pixel and identifying the other pixels adjacent to the first whose intensity also exceeds the reference level and recording the upper left and lower right coordinates of a box bounding each character;
   (c) identifying (labeling) all located characters and entering such identified characters as trained characters in memory;
   (d) repeating steps (a) thru (c) for every image in the training set;
   (e) creating a correlation matrix by computing a correlation coefficient for every trained character with every other trained character and storing such matrix in memory;

(f) defining a list of trained character possibilities for every unknown character to be recognized;

(g) setting an upper limit on the number of trained characters that will be tested for each unknown character;

2) recognizing unknown characters by:

(h) acquiring a two dimensional array of pixels;

(i) locating all unknown characters in a manner described in (b);

(j) selecting one of the unknown characters found in step (i) and selecting an initial trained character from the list of trained character possibilities for the unknown character;

(k) computing a correlation coefficient between the selected unknown character and the trained character;

(l) performing step (v) and succeeding steps if the correlation coefficient exceeds a threshold;

(m) performing step (n) and succeeding steps if the correlation coefficient does not exceed a threshold;

(n) performing step (p) and succeeding steps if the limit on the number of trained characters to be tested defined in step (g) has been exceeded;

(o) performing step (r) and succeeding steps if the limit on the number of trained characters to be tested defined in step (g) has not been exceeded;

(p) determining that the unknown character is not recognizable;

(q) repeating step (j) and succeeding steps until all unknown characters have been processed;

(r) eliminating the previously selected trained character from the list of trained character possibilities for the unknown character;

(s) searching along the row of the correlation matrix defined in step (e) corresponding to the most recently selected trained character for an entry that most closely matches the correlation coefficient found in step (k) and selecting as the next trained character to be tested the trained character corresponding to the column of this entry with the requirement that this trained character be contained in the list of trained character possibilities for the unknown character;

(t) incrementing the count of the number of trained characters tested for the unknown character;

(u) repeating steps (k) and all succeeding steps;

(v) saving the currently selected trained character as a candidate character for classifying the unknown character;

(w) eliminating the currently selected trained character from the list of trained character possibilities for the unknown character;

(x) performing step (bb) and succeeding steps if there are more entries in the list of trained character possibilities for the unknown character;

(y) performing step (z) and succeeding steps if there are no more entries in the list of trained character possibilities for the unknown character;

(z) classifying the unknown character as the most recently defined candidate character;

(aa) repeating step (j) and succeeding steps until all unknown characters have been processed;

(bb) searching along the row of the correlation matrix defined in step (e) corresponding to the most recently defined candidate character for an entry that exceeds a threshold and selecting as the next trained character to be tested the trained character corresponding to the column of this entry with the requirement that this trained character be contained in the list of trained character possibilities for the unknown character;

(cc) performing step (z) and all succeeding steps if a trained character can not be found in step (bb);

(dd) performing step (ee) and all succeeding steps if a trained character can be found in step (bb);

(ee) computing a correlation coefficient of the most recently selected trained character and the unknown character;

(ff) replacing the candidate character with the most recently selected trained character if the correlation coefficient computed in step (ee) exceeds the correlation coefficient of the candidate character and the unknown character;

(gg) removing the most recently selected trained character from the list of trained character possibilities for the unknown character;

(hh) repeating step (x) and all succeeding steps;

DESCRIPTION OF THE DRAWINGS

FIG. 3A shows the flow chart illustrating the decision logic to choose inspect or font training;

FIG. 3B shows the flow diagram for the font training portion of the control logic;

FIG. 3C shows the flow diagram for the inspect portion of the control logic;

FIG. 3D shows the main flow diagram for the correlation search method;

FIG. 3E shows the flow diagram for a sub-portion of the correlation search method;

FIGS. 4, 4A', 4A" AND 4B are graphic illustrations in support of an example of classifying an unknown character using correlation search;

FIGS. 4A' and 4A" show the sixteen character font; and

FIG. 4B shows the associated correlation matrix $R_{MxM}$.

DETAILED DESCRIPTION OF THE PREFERRED EMBODIMENT

Figure 1:
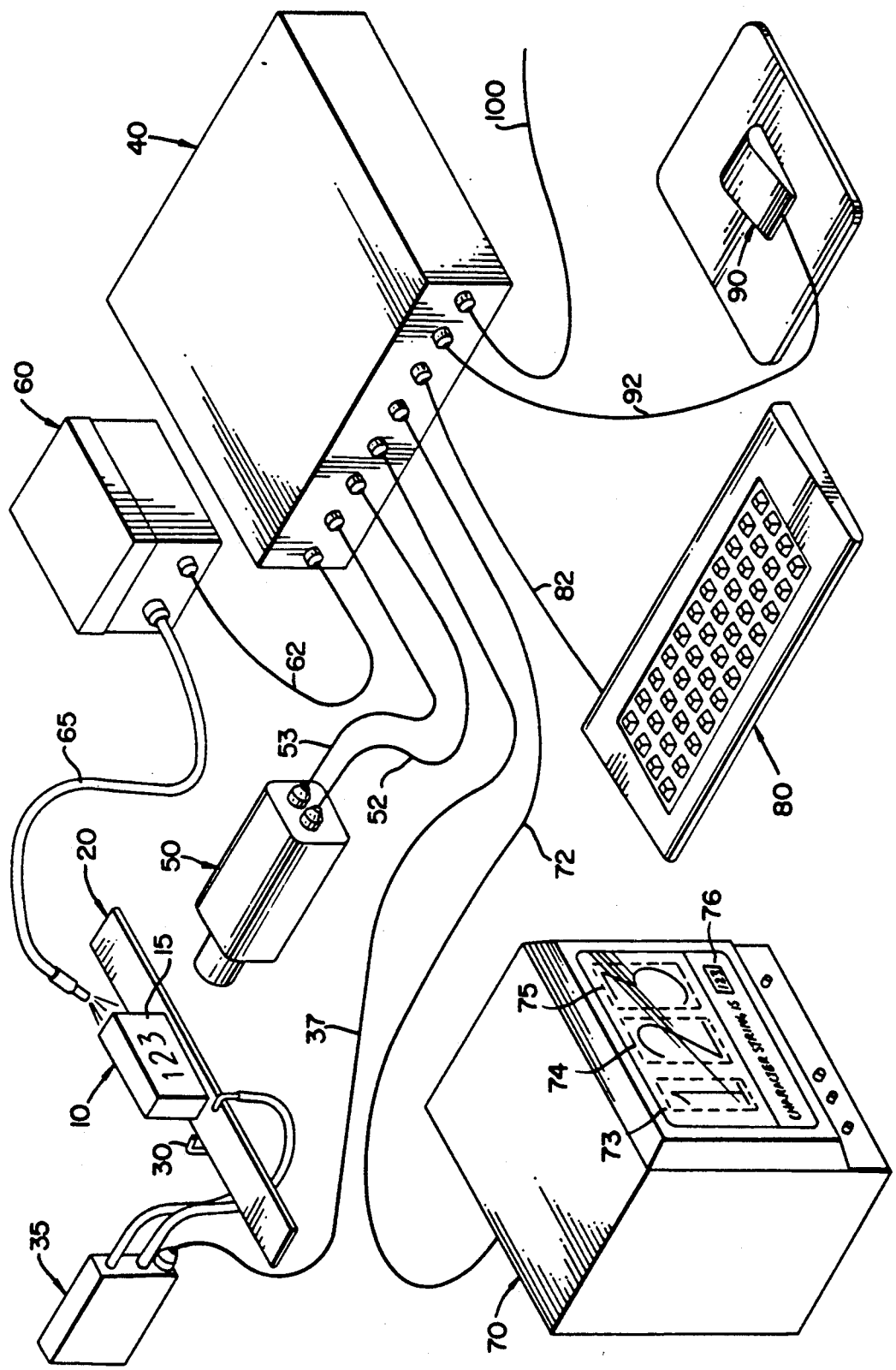
FIG. 1 is an illustration of an embodiment of the character recognition method in accordance with the present invention.

Referring to FIG. 1, there is shown the components of the preferred embodiment. There is a part 10 with printed characters 15 that are to be recognized. The part is moving on a conveyance unit 20 and is detected by an electro-optic sensor 30. Upon detection of the part, the electro-optic position sensor sends a signal to the sensor transducer unit 35. The transducer signals the logic and control unit 40 that the part is present in the field of view of the video camera 50 via the part detect cable 37.

Upon receipt of the part detect signal, the logic and control unit commands a stroboscopic light source 60 via the light source trigger cable 62 to generate a pulse of light given that the video camera is ready to capture the next video frame. The logic and control unit knows when the camera is ready to capture the next video frame since it controls the timing of the camera via the video sync cable 53.

The pulsed light from the stroboscopic light source illuminates the moving part via the fiber-optic bundle 65. The pulsed light essentially "freezes" the moving part and renders a sharp image of it when captured by the video camera 50.

Upon the capture of an image, the analog video signal is transferred from the camera to the logic and control unit 40 via the video cable 52. The logic and control unit displays the processed video image along with superimposed text on a video monitor 70 via the monitor cable 72. The type of information displayed on the monitor depends on whether the logic and control unit is in the training mode or the inspect mode, the details of which are described below with reference to FIGS. 3B thru FIG. 3E. The example monitor display of FIG. 1 shows the results of an sample inspection. The captured image is displayed and boxes 73, 74 and 75 are drawn around the three characters that the logic and control unit has located in this example. Also shown on the monitor is textual information 76 indicating what classification the logic and control unit has assigned to the three located characters (in this example they are shown correctly classified as the numbers '1', '2', and '3') as the result of an inspection.

A keyboard 80 and a pointing device (mouse) 90 are also shown to provide a means for user input to the logic and control unit. The keyboard is interfaced to the logic and control unit via the keyboard cable 82. The pointing device is interfaced to the logic and control unit via the pointing device cable 92.

An interface to a host computer 100 provides a means for communicating the results of the inspection to another processing unit for defect sorting and/or statistical analyses.

Figure 2:
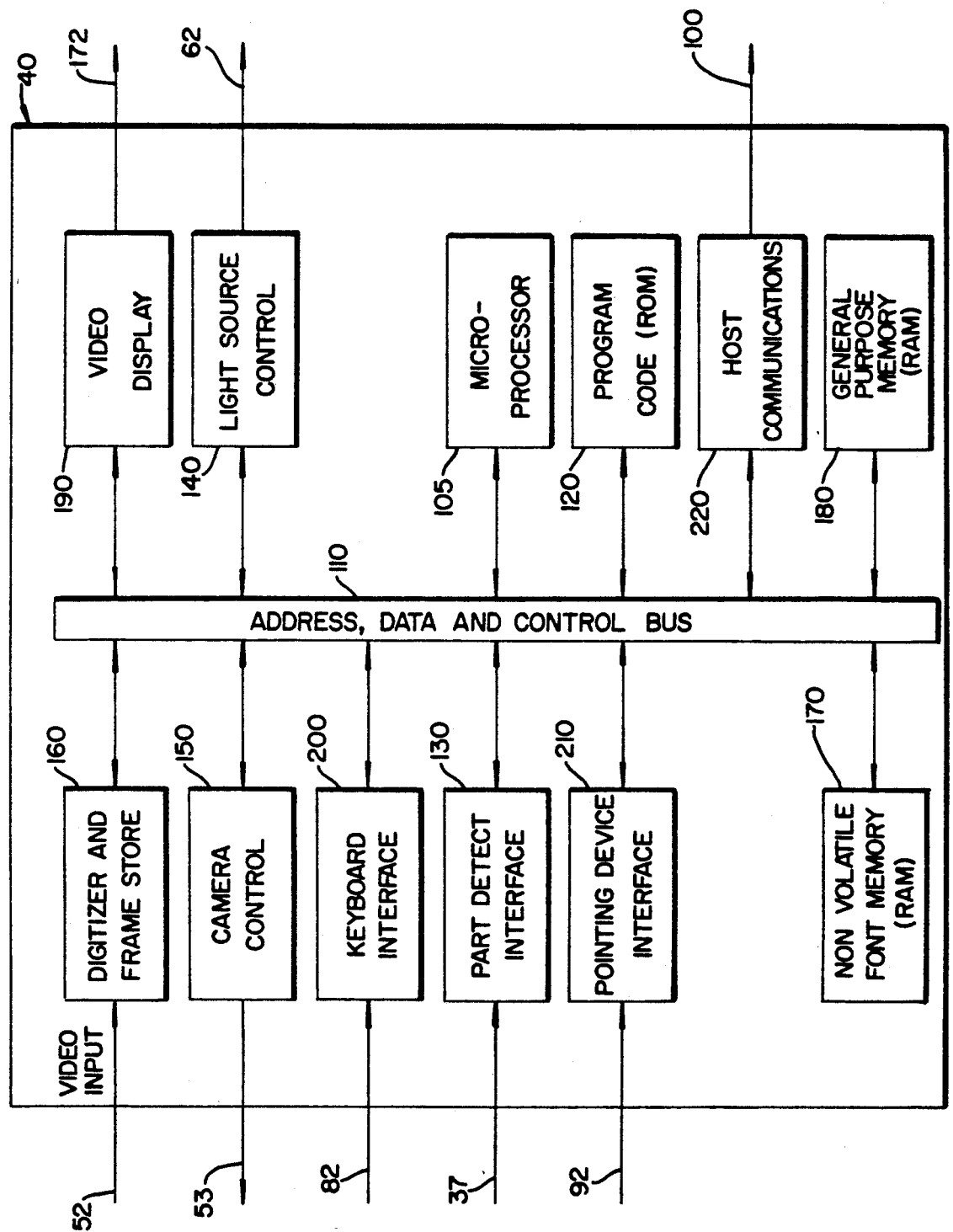
FIG. 2 is a schematic of the logic and control unit 40 of FIG. 1.

FIG. 2 shows in block diagram form the components of the logic and control unit 40, the details of which are described below. A microprocessor 105 acts as the main controller of the logic and control unit and receives input and provides output to the other components of FIG. 2 via the address, data, and control bus 110. The microprocessor receives its' instructions from program code stored in nonvolatile memory (ROM) 120.

A part detect interface 130 receives the part detect signal from the sensor transducer unit 35 via the part detect cable 37. The part detect interface signals the microprocessor when a part is in the field of view of the video camera. The microprocessor triggers the light source 60 via the light source interface 140 at the precise instant in time when the camera 50 is capable of capturing a video frame. The camera control module 150 provides the timing signals to the camera via the video sync cable 53 and alerts the microprocessor when the camera is ready to capture the next video frame.

The analog video output from the camera is digitized and stored upon command from the microprocessor by the digitizer and frame store module 160. The digitized video is accessible by the microprocessor for locating characters and computing correlation coefficients in a manner described below with reference to FIGS. 3B thru 3E.

The data associated with the trained characters in a font are stored in a block of memory, preferably nonvolatile, labeled font memory 170. Font memory contains all the pixel data associated with each trained character that are used to compute correlation coefficients. The trained character data are addressed by the microprocessor via a list of pointer references stored in the general purpose memory 180. The general purpose memory provides a means for storing additional data as described below with reference to FIGS. 3A thru 3E.

The video data from the digitizer and frame store 160 are displayed on a monitor by means of the video display module 190 and the monitor cable 72. The microprocessor has the capability of overlaying graphics and textual information on top of the video to provide the user a means of viewing the results of an inspection and to prompt the user during font training.

The keyboard interface module 200 and the pointing device interface module 210 provide the interface from the keyboard and pointing device units and alerts the microprocessor when a key is pressed.

Figure 3A:
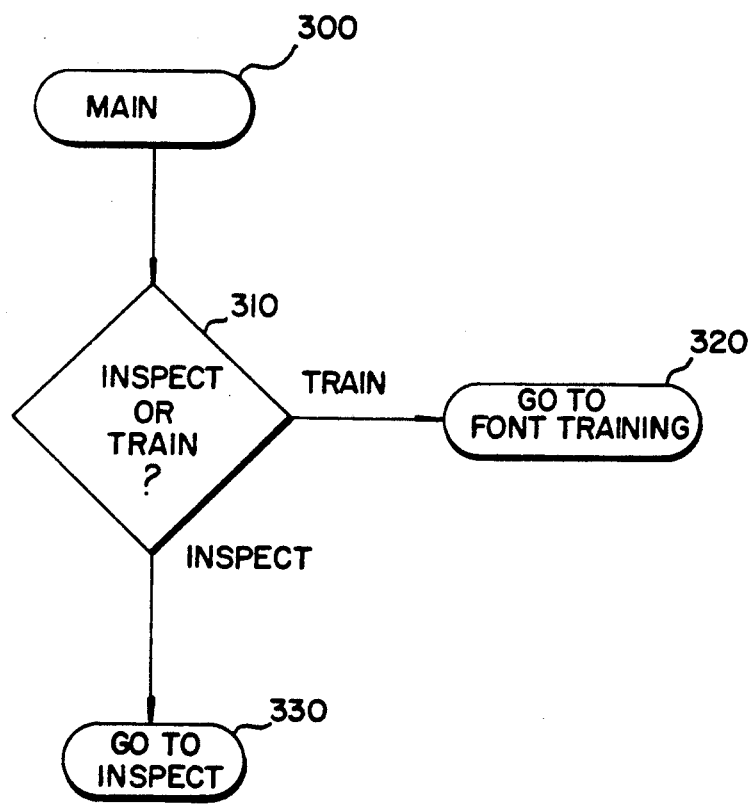
FIG. 3A thru 3E are flow charts illustrating an embodiment of the control logic followed by the logic and control unit 40 of FIG. 2.

The host communications module 220 provides the interface from the microprocessor to a host computer and provides the gateway for sending the results of an inspection for subsequent sorting or statistical analysis FIG. 3A shows a flow diagram illustrating a portion of the logic followed by the logic and control unit 40. Control begins with the main label 300. This is the beginning of the control loop. The user is then queried as to whether the unit is to inspect or a font is to be trained 310. This question appears on the video monitor 70. The user responds via the keyboard 80 or pointing device 90 and control is directed either to font training 320 or inspect 330.

Figure 3B:
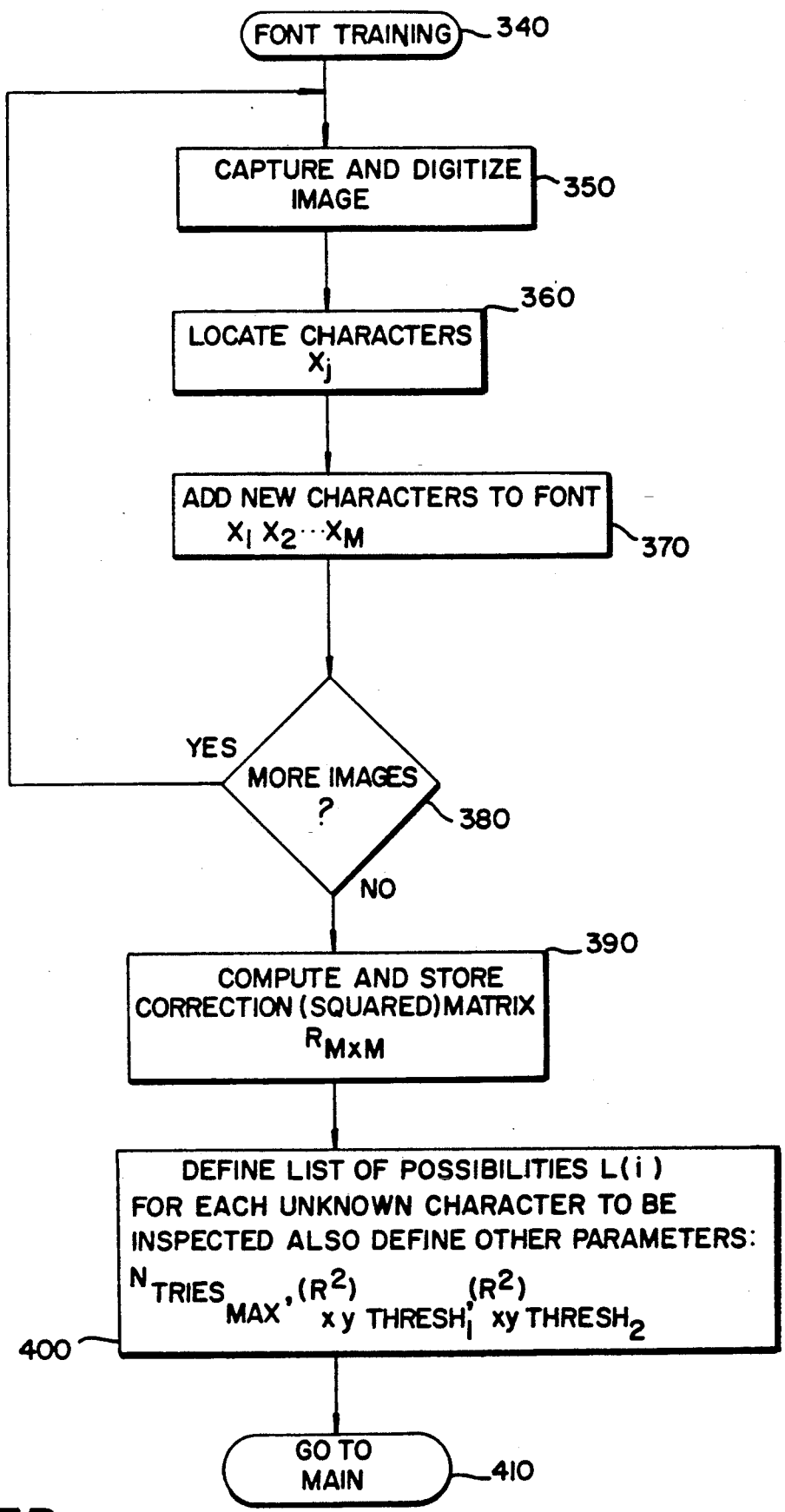

FIG. 3B shows a flow diagram illustrating the font training portion of the logic followed by the logic and control unit 40. Training begins with the font training label 340 and is followed by the capture and digitization of an image 350 step upon the receipt of a part detect signal as discussed previously with reference to FIG. 1 and FIG. 2.

Next, all of the characters are located in a predefined region of interest in the image 360. This is accomplished by selectively scanning columns or rows of the predefined area of the image and comparing the light value of each pixel with a reference value to determine the first pixel of each character and recording the location (column and row coordinates) of such pixel and identifying the other pixels adjacent to the first whose intensity also exceeds the same reference level and thus determining and recording the upper left and lower right coordinates of a box bounding each character. The located characters are displayed on the video monitor with a box bounding each character and the user is prompted for a label for each character. The pixel data for each new trained character $x_j$ are then extracted from the image and are stored in the font memory 170 portion of the logic and control unit 370. In this manner, more trained characters can be added to the font from multiple images 380.

After the font $\{x_1, x_2, \ldots, x_M\}$ has been trained, a correlation matrix $R_{M \times M}$ 370 of every trained character with every other trained character is computed and stored in general purpose memory 180. This matrix is used by the correlation search method during inspect. The next step is to establish any a priori knowledge about the list of possibilities (constraints) L(i) for each unknown character $y_i$ to be recognized 400. That is, the user may know that a particular string of characters can only be numeric rather than alphanumeric. Or perhaps the user knows that a particular character in a string is the first letter of the month. Then the list of possibilities for that character are only $\{A, D, F, J, M, N, O, S\}$. One extreme case is when the user knows nothing about the characters, not even the number of characters, except that they are members of a particular font. Then the list of possibilities for each character becomes the entire font. The other extreme is when the user knows exactly what the character should be and wishes to verify its' presence (or absence). In this case, the list of possibilities has only one element. Constraining the possibilities that an unknown character can be by using a priori information as described above decreases computation time and reduces error rates.

As was mentioned previously, it might happen that the unknown character y is not highly correlated with any of the trained characters $\{x_1, x_2, \ldots, x_M\}$. In this case, correlation search will test all of the trained characters in the font before ultimately deciding that the unknown character y can not be recognized. The computation time for this case may be prohibitive. To prevent this, a maximum limit, $N_{triesmax}$ 400, is defined on the number of tries that correlation search will perform.

Also included in this last step is the setting of the two thresholds $(R^2_{xy})_{thresh1}$ and $(R^2_{xy})_{thresh2}$. The first threshold is used to decide when a trained character is a likely candidate for classifying an unknown character. The second threshold is used to check for any other trained characters highly correlated with a candidate trained character. The use of these thresholds will be explained further below with reference to FIGS. 3D and 3E.

Completion of the above tasks ends font training and control returns to Main 410.

Figure 3C:
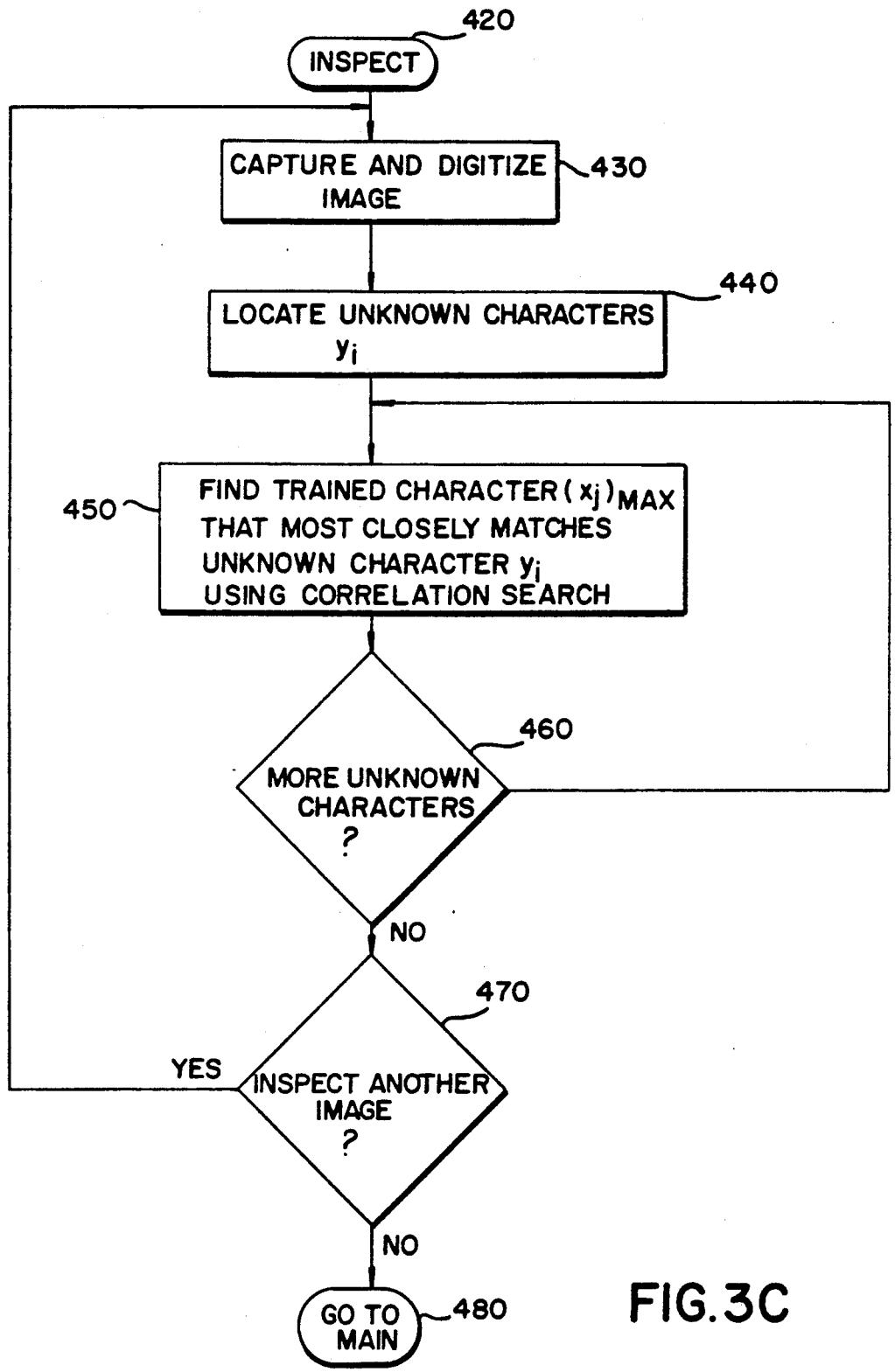

FIG. 3C shows a flow diagram illustrating the inspect portion of the logic followed by the logic and control unit 40. Inspect begins with the inspect label 420 and is followed by the capture and digitization of an image 430 step upon the receipt of a part detect signal as discussed previously with reference to FIG. 1 and FIG. 2.

Next, all of the unknown characters are located in a predefined region of interest in the image 440. This is accomplished in exactly the same manner as the procedure described for locating characters in the font training process of FIG. 3B.

Once all of the unknown characters have been located, each unknown character $y_i$ is then recognized by finding the trained character $(x_j)_{max}$ corresponding to the highest correlation $(R^2_{xy})_{max}$ as determined by the correlation search algorithm 450 described in detail below with regards to FIG. 3D and FIG. 3E. If an acceptable match is not found between $y_i$ and any of the trained characters, then this is reported by the correlation search algorithm.

A test is made to check for additional unknown characters 460 and if true then steps 430 thru 450 are repeated. The logic and control unit will loop back to capture another image if in a continuous inspect mode 470, otherwise it will branch back to main 480.

Figure 3D:
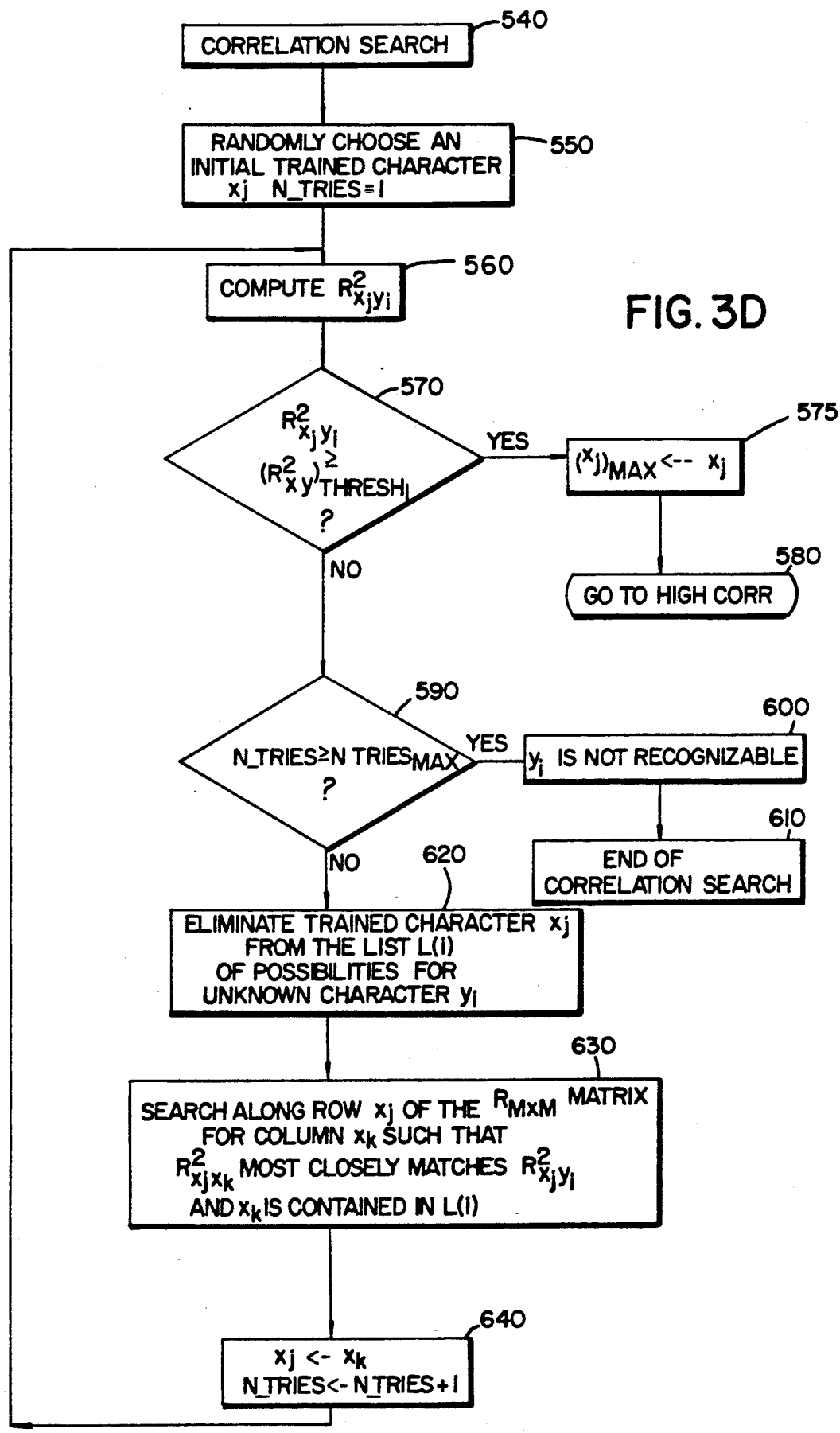

FIG. 3D shows a flow diagram illustrating the correlation search 540 portion of the logic followed by the logic and control unit 40.

The first step is to make an initial guess as to which trained character $x_j$ the unknown character $y_i$ might be 550. This is can be done by randomly choosing a trained character from the predefined list of possibilities L(i) for unknown character $y_i$. The variable $N_{tries}$ is also set to one.

The next step is to compute the correlation coefficient $R^2_{xjyi}$ for the trained character $x_j$ and the unknown character $y_i$ using equation (4) defined previously. This correlation score is then compared to a threshold $(R^2_{xy})_{thresh1}$ 570. If $R^2_{xjyi}$ is greater than $(R^2_{xy})_{thresh1}$, then $x_j$ becomes a candidate for classifying $y_i$. This is indicated by identifying $x_j$ as $(x_j)_{max}$ 575 and proceeding to determine if any other trained characters are highly correlated with $(x_j)_{max}$ 580. This task is described in the flow diagram high corr shown in FIG. 3E and discussed below.

If $R^2_{xjyi}$ is less than $(R^2_{xy})_{thresh1}$, then a test is made to determine if the variable $N_{tries}$ is greater than or equal to the maximum limit $N_{triesmax}$. If the limit is exceeded, then the unknown character $y_i$ is classified as not recognized 600 and the correlation search algorithm is terminated 610. However, if the maximum number of tries limit $N_{triesmax}$ is not exceeded, then the previously tried trained character $x_j$ is eliminated from the list of possibilities L(i) for unknown character $y_i$ 620 and the row of $R_{MxM}$ corresponding to the trained character $x_j$ is searched for an entry $R^2_{xjxk}$ that most closely matches the value $R^2_{xjyi}$ 630. The trained character $x_k$, corresponding to this column of $R_{MxM}$ becomes the next trained character to try 640 if it is also contained in the allowed list of possibilities L(i) for unknown character $y_i$ 630. The counter $N_{tries}$ is incremented 640 and control loops back to the top of the correlation search algorithm 560.

Figure 3E:
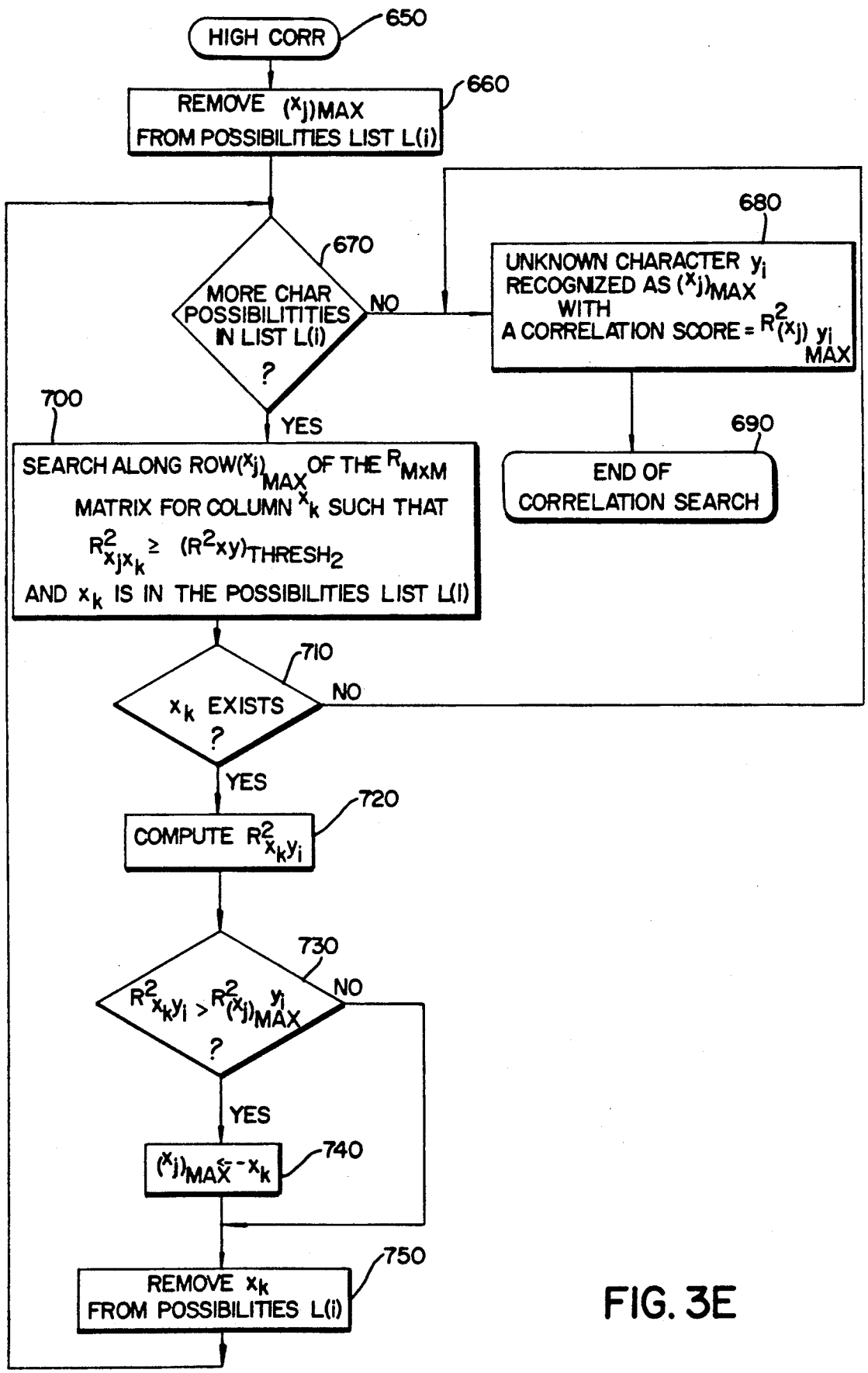

FIG. 3E shows a flow diagram illustrating the high corr 650 portion of the correlation search algorithm followed by the logic and control unit 40. The first step in the high corr flow diagram removes the trained character $(x_j)_{max}$ from the list of possibilities L(i) for unknown character $y_i$ 660. That is, L(i) contains a list of untried trained characters. Trained character $(x_j)_{max}$ has already been tried and must therefore be removed from the list.

The next step is a check of the possibilities list L(i) to determine if there are any more trained characters to test. If there are no other possibilities, i.e., the list L(i) is empty, then unknown character $y_i$ is recognized as the trained character $(x_j)_{max}$ with a correlation score $R^2_{(xj)maxyi}$ 680 and the correlation search algorithm terminates 690.

However, if the list L(i) is not empty, then the row of $R_{MxM}$ corresponding to trained character $(x_j)_{max}$ is searched for an entry $R^2_{xjxk}$ that is greater than the threshold $(R^2_{xy})_{thresh2}$ and $x_k$ is contained in the list of possibilities L(i) for unknown character $y_i$ 700. That is, this step checks if there are any other allowed trained characters highly correlated with the candidate trained character $(x_j)_{max}$ that must be tested before unknown character $y_i$ can be classified.

If there are not any other highly correlated trained characters, i.e., $x_k$ does not exist 710, then unknown character $y_i$ is recognized as trained character $(x_j)_{max}$ with a correlation score $R^2_{(xj)maxyi}$ 680 and the correlation search algorithm terminates 690.

Otherwise, $x_k$ does exist and the correlation $R^2_{xkyi}$ is computed 720 using equation (4) described above. The correlation $R^2_{xkyi}$ is compared with the previously computed score $R^2_{(xj)maxyi}$ 730 and if $R^2_{xkyi}$ is greater than $R^2_{(xj)maxyi}$ then $x_k$ becomes the new candidate 740 for class the unknown character $y_i$. Otherwise, the previous candidate $(x_j)_{max}$ remains unchanged. In either case, trained character $x_k$ is removed from the list L(i) and control returns to the top of the high corr flow diagram 660.

As an example of how correlation search operates, consider the sixteen character font illustrated in FIG. 4A. Each trained character in this font is seven pixels high and five pixels wide. The light value of each pixel is from 0 to 255 (i.e., the images are digitized to 8 bits). The trained characters are: '0' 760, '1' 761, '8' 762, '9' 763, 'B' 764, 'C' 765, 'D' 766, 'E' 767, 'F' 768, 'G' 769, 'I' 770, 'O' 771, 'P' 772, 'Q' 773, 'R' 774, and 'T' 775. The correlation matrix $R_{MxM}$ is illustrated in FIG. 4B 780 where every element $R^2_{xjxk}$ of $R_{MxM}$ was computed using the data shown in FIG. 4A by means of equation (4). (The correlations have been scaled by 100 and truncated to an integer value for convenience).

In this example, one unknown character $y_i$ is to be classified using the above font. Unknown character $y_i$ is really a slightly degraded 'Q' 773 (unknown to the character recognition apparatus). The list of possibilities L(i) for this unknown character is defined by the user as the entire font. The maximum allowed number of tries is set at half the size of the font, i.e., $N_{triesmax}=8$. The two thresholds $(R^2_{xy})_{thresh1}$ and $(R^2_{xy})_{thresh2}$ are set at 75 and 70 respectively scaled by 100).

The path taken by the correlation search algorithm is shown in Table 1.

TABLE 1

| Step No. | $x_j$ | $R^2_{x_j y_i}$ | $x_k$ |
|---|---|---|---|
| 1 | 'F' | 1 | 'I' |
| 2 | 'I' | 0 | '8' |
| 3 | '8' | 36 | 'D' |
| 4 | 'D' | 57 | 'C' |
| 5 | 'C' | 55 | 'Q' |
| 6 | 'Q' | 95 | 'O' |
| 7 | 'O' | 80 | — |

The first step of correlation search is to randomly choose an initial guess of the unknown character. As shown in Table I, the trained character 'F' was chosen in this example and resulted in a correlation of '1' with the unknown character $y_i$. This result is significantly less than the threshold of 75.

Hence, 'F' is eliminated from L(i) and the 'F' row 782 of $R_{MxM}$ is searched for the entry that most closely matches the above result. As seen in FIG. 4B, a '1' occurs for the column marked as 'I' 783. Thus, trained character 'I' is tried and results in a correlation of '0' with the unknown character $y_i$.

Thus, 'I' is eliminated from L(i) and row 'I' 784 of $R_{MxM}$ is searched for an entry that most closely matches the previous result of '0'. As seen in FIG. 4B, there are 10 zeroes along row 'I'. The decision is made to choose the first zero. This corresponds to the column marked as '8' 785. The correlation is computed with the trained character '8' as '36'. This value is less than the threshold of 75 but much greater than the result for the result for the 'I'. Thus, correlation search is "hill climbing" thru the correlation space as defined by the $R_{MxM}$ matrix.

The '8' is eliminated from L(i) and row '8' 786 of $R_{MxM}$ is searched for an entry that most closely matches the observed result of '36'. This is found in the column 'D' 787. Hence, the fourth iteration is the trial of trained character 'D'. As seen in Table I, a correlation of 'D' with $y_i$ results in a score of '57' which is less than the threshold of '75' but higher than the previous result of 36.

Hence, 'D' is eliminated from L(i) and row 'D' 788 of $R_{MxM}$ is searched for an entry that most closely matches '57' The entry for column 'C' (55) 789 and the entry for column 'Q' (59) 791 are equally distant from '57'. The first trained character, i.e., the 'C', is chosen. The letter 'D' is eliminated from L(i) and row 'C' 790 of $R_{MxM}$ is searched for an entry that most closely matches the previous result of '57'. The closest match is for columns 'D' (55) 787 and 'Q' (55) 791. However, the 'D' was previously eliminated from L(i). Hence, trained character 'Q' is tried in the sixth trial. This results in a correlation with $y_i$ of 95 which is greater than $(R^2_{xy})_{thresh1}$. Thus, 'Q' is a candidate for classifying the unknown character $y_i$.

The next step is to scan along the 'Q' row 792 for any other trained characters that are highly correlated with 'Q' greater than the second threshold $(R^2_{xy})_{thresh2}$ which is set at '70'. As seen from FIG. 4B, there is only one trained character, the 'O' 793, that is correlated highly enough with the 'Q' that must be checked. As seen from Table I, the correlation of 'O' with $y_i$ is computed as '80'. This is less than the correlation of 'Q' with $y_i$. Thus, the unknown character $y_i$ is classified as a 'Q'.

In the above example, the unknown character $y_i$ was correctly classified as a 'Q' after having tested seven trained characters from the font. If correlation search were not used, all sixteen trained characters would have to be tried before a final classification could be made. The savings in computation time was over fifty percent.

The invention has been described in detail with particular reference to a preferred embodiment thereof, but it will be understood that variations and modifications can be effected within the spirit and scope of the invention. Such variations could include, but are not limited to, document scanners which scan the document with a linear, one dimensional, scanner one line at a time and build the image sequentially in a digital frame store. For example, the documents could contain text composed of multiple fonts with various styles such as bold or italic.

We claim:

1. A method of character recognition, comprising the steps of:
   1) font training or creating a font of trained characters by:
      (a) acquiring an image composed of a two dimensional array of pixels;
      (b) locating all of the characters in the image by selectively scanning columns or rows of a predetermined area of the image and comparing each pixels intensity with a reference level to determine the first pixel of each character and recording the location (column and row coordinates) of such pixel and identifying the other pixels adjacent to the first whose intensity also exceeds the reference level and recording the upper left and lower right coordinates of a box bounding each character;
      (c) identifying (labeling) all located characters and entering such identified characters as trained characters in memory;
      (d) repeating steps (a) thru (c) for every image in the training set;
      (e) creating a correlation matrix by computing a correlation coefficient for every trained character with every other trained character and storing such matrix in memory;
      (f) defining a list of trained character possibilities for every unknown character to be recognized;
      (g) setting an upper limit on the number of trained characters that will be tested for each unknown character;
   2) recognizing unknown characters by:
      (h) acquiring a two dimensional array of pixels;
      (i) locating all unknown characters in a manner described in (b);

(j) selecting one of the unknown characters found in step (i) and selecting an initial trained character from the list of trained character possibilities for the unknown character;

(k) computing a correlation coefficient between the selected unknown character and the trained character;

(l) performing step (v) and succeeding steps if the correlation coefficient exceeds a threshold;

(m) performing step (n) and succeeding steps if the correlation coefficient does not exceed a threshold;

(n) performing step (p) and succeeding steps if the limit on the number of trained characters to be tested defined in step (g) has been exceeded;

(o) performing step (r) and succeeding steps if the limit on the number of trained characters to be tested defined in step (g) has not been exceeded;

(p) determining that the unknown character is not recognizable;

(q) repeating step (j) and succeeding steps until all unknown characters have been processed;

(r) eliminating the previously selected trained character from the list of trained character possibilities for the unknown character;

(s) searching along the row of the correlation matrix defined in step (e) corresponding to the most recently selected trained character for an entry that most closely matches the correlation coefficient found in step (k) and selecting as the next trained character to be tested the trained character corresponding to the column of this entry with the requirement that this trained character be contained in the list of trained character possibilities for the unknown character;

(t) incrementing the count of the number of trained characters tested for the unknown character;

(u) repeating steps (k) and all succeeding steps;

(v) saving the currently selected trained character as a candidate character for classifying the unknown character;

(w) eliminating the currently selected trained character from the list of trained character possibilities for the unknown character;

(x) performing step (bb) and succeeding steps if there are more entries in the list of trained character possibilities for the unknown character;

(y) performing step (z) and succeeding steps if there are no more entries in the list of trained character possibilities for the unknown character;

(z) classifying the unknown character as the most recently defined candidate character;

(aa) repeating step (j) and succeeding steps until all unknown characters have been processed;

(bb) searching along the row of the correlation matrix defined in step (e) corresponding to the most recently defined candidate character for an entry that exceeds a threshold and selecting as the next trained character to be tested the trained character corresponding to the column of this entry with the requirement that this trained character be contained in the list of trained character possibilities for the unknown character;

(cc) performing step (z) and all succeeding steps if a trained character can not be found in step (bb);

(dd) performing step (ee) and all succeeding steps if a trained character can be found in step (bb);

(ee) computing a correlation coefficient of the most recently selected trained character and the unknown character;

(ff) replacing the candidate character with the most recently selected trained character if the correlation coefficient computed in step (ee) exceeds the correlation coefficient of the candidate character and the unknown character;

(gg) removing the most recently selected trained character from the list of trained character possibilities for the unknown character;

(hh) repeating step (x) and all succeeding steps.

2. The method of claim 1 wherein the initial trained character selection step (j) includes:
(a) randomly selecting the initial trained character from the list of trained character possibilities for the unknown character.

3. The method of claim 1 wherein the initial trained character selection step (j) includes:
(a) selecting the initial trained character from the list of trained character possibilities for the unknown character as the trained character with the highest frequency of occurrence based on previous unknown character classifications.

4. The method of claim 1 wherein:
(a) the trained character identification step (c) of claim 1 includes determining the height and width of each trained character and storing such results to memory;
(b) the unknown character location step (i) of claim 1 includes determining the height and width of each unknown character and storing such results to memory;
(c) the selecting the initial trained character step (j) of claim 1 includes the requirement that the height and width of the initially selected trained character be within a prescribed tolerance of the unknown trained character;
(d) the searching step (s) of claim 1 includes the additional requirement that the height and width of the trained character to be selected next be within a prescribed tolerance of the unknown trained character;
(e) the searching step (bb) of claim 1 includes the additional requirement that the height and width of the trained character to be selected next be within a prescribed tolerance of the unknown character.

5. The method of claim 1 wherein the character location step (a) is provided by a connectivity algorithm.

* * * * *